United States Patent
Leroy (10) Patent No.: US 11,412,217 B2
(45) Date of Patent: *Aug. 9, 2022

(54) COMPRESSION OF A COLLECTION OF IMAGES USING PATTERN SEPARATION AND RE-ORGANIZATION

(71) Applicant: Adobe Inc., San Jose, CA (US)

(72) Inventor: Luc Leroy, Los Gatos, CA (US)

(73) Assignee: ADOBE INC., San Jose, CA (US)

(*) Notice: Subject to any disclaimer, the term of this patent is extended or adjusted under 35 U.S.C. 154(b) by 1081 days.

This patent is subject to a terminal disclaimer.

(21) Appl. No.: 16/017,589

(22) Filed: Jun. 25, 2018

(65) Prior Publication Data

US 2018/0376142 A1 Dec. 27, 2018

Related U.S. Application Data (63) Continuation of application No. 12/613,613, filed on Nov. 6, 2009, now Pat. No. 10,038,902.

(51) Int. Cl.
*H04N 19/115* (2014.01)
*H04N 19/176* (2014.01)
(Continued)

(52) U.S. Cl.
CPC ....... *H04N 19/115* (2014.11); *G06V 10/7715* (2022.01); *H04N 19/14* (2014.11);
(Continued)

(58) Field of Classification Search
CPC .... H04N 19/115; H04N 19/14; H04N 19/176; H04N 19/172; H04N 19/60; G06V 10/7715
See application file for complete search history.

(56) References Cited

U.S. PATENT DOCUMENTS 5,327,248 A 7/1994 Miller et al.
5,365,604 A 11/1994 Kwok et al.
(Continued)

FOREIGN PATENT DOCUMENTS

| EP | 0718788 A2 | 6/1996 |
|---|---|---|
| WO | 2005/008595 A1 | 1/2005 |
| WO | 2005/076211 A1 | 8/2005 |

OTHER PUBLICATIONS

U.S. Appl. No. 12/613,613, Advisory Action, dated Nov. 12, 2015, 4 pages.

(Continued)

*Primary Examiner* — John B Strege
(74) *Attorney, Agent, or Firm* — Kilpatrick Townsend & Stockton LLP (57) ABSTRACT

Embodiments herein include an image manager that provides for image compression by rearranging an order of blocks from one or more images and then sorting and writing those blocks into one or more different images. This technique enables using a high-level of image compression to reduce a relatively large amount of pixels to a common subset of values than would ordinarily be possible with the original image(s). This can include extracting a plurality of blocks from a graphical digital image file. Each block from the graphical digital image file can be a group of pixels. The image manager analyzes each block to produce a corresponding variation value for each of the blocks, indicating a level of variation of pixel data within a respective block. The image manager sorts blocks according to the variation values, and can apply a level of image compression to each respective block, based on the variation value and/or average color of each respective block, to compress each respective block. For a given image or set of images, certain techniques disclosed herein can yield an image archive having a file size (Continued)

that is about two to four times smaller than conventional archiving techniques applied to the same given image or set of images.

20 Claims, 7 Drawing Sheets

(51) Int. Cl.
*H04N 19/14* (2014.01)
*G06V 10/77* (2022.01)
*H04N 19/172* (2014.01)
*H04N 19/60* (2014.01)

(52) U.S. Cl.
CPC ......... *H04N 19/176* (2014.11); *H04N 19/172* (2014.11); *H04N 19/60* (2014.11)

(56) References Cited

U.S. PATENT DOCUMENTS

| | | | |
|---|---|---|---|
| 5,909,518 A * | 6/1999 | Chui | ............... G10L 19/00 |
| | | | 382/277 |
| 5,974,182 A | 10/1999 | Bryniarski | |
| 6,047,087 A | 4/2000 | Imaizumi et al. | |
| 6,128,406 A | 10/2000 | Ostrovsky | |
| 6,373,981 B1 | 4/2002 | de Queiroz et al. | |
| 6,459,816 B2 * | 10/2002 | Matsuura | ............... G06T 9/005 |
| | | | 375/240.03 |
| 7,116,832 B2 | 10/2006 | Bruna et al. | |
| 7,158,679 B2 | 1/2007 | Yutaka et al. | |
| 7,212,677 B2 | 5/2007 | Mishimi | |
| 7,865,479 B2 | 1/2011 | Gu et al. | |
| 2004/0150538 A1 * | 8/2004 | Kim | ............... H04N 19/91 |
| | | | 341/67 |
| 2005/0271277 A1 | 12/2005 | Lin et al. | |
| 2006/0013495 A1 | 1/2006 | Duan et al. | |
| 2007/0274599 A1 | 11/2007 | Ishikawa | |
| 2010/0104221 A1 | 4/2010 | Yeung et al. | |

OTHER PUBLICATIONS

U.S. Appl. No. 12/613,613, Final Office Action, dated Jan. 30, 2014, 21 pages.
U.S. Appl. No. 12/613,613, Final Office Action, dated Feb. 27, 2013, 23 Pages.
U.S. Appl. No. 12/613,613, Final Office Action, dated Jul. 30, 2015, 26 pages.
U.S. Appl. No. 12/613,613, Non-Final Office Action, dated Aug. 16, 2013, 18 pages.
U.S. Appl. No. 12/613,613, Non-Final Office Action, dated Sep. 20, 2012, 18 pages.
U.S. Appl. No. 12/613,613, Non-Final Office Action, dated Jan. 16, 2015, 21 pages.
verypdf.com, "JPEG2000 Compression Advanced PDT Tools v2.0", Aug. 17, 2009, 4 pages.
Notice of Allowance from related U.S. Appl. No. 12/613,613 dated Mar. 28, 2018, 10 pages.

* cited by examiner

COMPRESSION OF A COLLECTION OF IMAGES USING PATTERN SEPARATION AND RE-ORGANIZATION

CROSS-REFERENCE TO RELATED APPLICATIONS

This application is a continuation of U.S. patent application Ser. No. 12/613,613, filed Nov. 6, 2009, entitled "Compression of a collection of images using pattern separation and re-organization," allowed, which is herein incorporated by reference in its entirety.

BACKGROUND

The present disclosure relates to graphical digital images. Graphical images can be represented electronically in several types of formats. One type of format is a bitmap image, which is also known as a raster image. A bitmap, or raster, image is typically structured as a grid or array of pixels. For each pixel, a bitmap image includes data to indicate one or more visual properties of that pixel such as color, brightness, hue, transparency, etc.

There are various file formats for electronically storing a bitmap image, namely, Graphics Interchange Format (GIF), Portable Network Graphics (PNG), Tagged Image File Format (TIFF), and Joint Photographic Experts Group (JPEG), among others. Image quality of a bitmap image can correspond to a total number of pixels stored within a given image file, or to a degree of lost data from image compression. As pixel count and quality increases, however, so does a file storage size. Individual bitmap files, and collections of bitmap files, can require large amounts of computer storage.

SUMMARY

File sizes of large and/or high-quality graphical digital images can consume large amounts of computer resources for storage, and large amounts of bandwidth for transmission. Transmitting a collection of such images can be even more challenging.

One technique to address large file sizes is file compression or archiving. For example, one conventional archive format known as the ZIP file format, can compress one or more files of various formats by compressing each file separately. In addition to general data archiving formats, conventional image compression algorithms operate on individual files of a specific type. For example, the JPEG algorithm refers to several standards for image compression. These conventional standards were developed by the Joint Photographic Experts Group. JPEG compression uses a lossy compression that operates by replacing a range of values with a single average value. This means that some image data are lost. Compressing an image using a high-level of JPEG compression yields a smaller file size, but also yields a corresponding loss in image quality, that is, image degradation. Compressing an image using a low-level JPEG compression maintains a higher level of image quality, but with little reduction in file size.

Techniques disclosed herein include systems and methods for providing image compression by rearranging an order of blocks from one or more images and then sorting and writing those blocks into one or more new or different images. This technique enables using a high level of image compression to reduce a relatively large amount of pixels to a common subset of values than would ordinarily be possible with the original image(s). In one embodiment, an advantage of using techniques disclosed herein is providing image compression that is about 0.1 to 4 times better than conventional compression methods, or that provides a higher compression ratio at a same image quality. In other words, for a given set of images, certain techniques disclosed herein can yield an image archive having a file size that is about two to four times smaller than conventional archiving techniques applied to the same given set of images. Alternatively, for the given set of images, certain techniques disclosed herein can yield an image archive of a same given file size of a conventional archive, but with archived images having four times better image quality than with images archived using conventional methods.

In one embodiment, an image manager extracts a plurality of blocks from a graphical digital image file. The graphical digital image file defines an array of pixels for representing a graphical image. Each block from the graphical digital image file comprises a group of pixels. In other words, the array or grid of pixels can be divided or sectioned into groups of pixels. The image manager analyzes each block from the plurality of blocks to produce a corresponding variation value for each of the blocks. Each corresponding variation value indicates a level of variation of pixel data within a respective block. For example, a given block of pixels can have pixels with many different colors or with just a few colors. Blocks having many colors or much contrast have larger amounts of variation of pixel data, while blocks having just a few colors or little contrast have smaller amounts of variation among pixel data.

The image manager sorts the plurality of blocks according to the variation values produced for the blocks. For example, the image manager can sort the plurality of blocks from blocks having low variation values to blocks having high variation values. The image manager then identifies a level of image compression applied to each respective block based on the variation value of each respective block. The level of image compression affects image quality. For example, a high level of image compression means that more data is lost during compression, resulting in a smaller image file size. Thus, high compression typically corresponds to high degradation. Likewise, a low level of image compression means that less data is lost during compression, resulting in a larger image file size. Low image compression typically corresponds to low image degradation by essentially keeping raw data. There can be any number of selectable levels of image compression ranging from no loss of data to extensive loss of data. The image manager compresses each respective block using the level of image compression identified to apply to each respective block.

In addition to sorting the blocks based on variation values, the image manager can also sort the blocks according to color values produced or identified for the blocks. This can be, for example, an average color value of pixels within a given block.

In another embodiment, the image manager extracts the plurality of blocks from graphical digital image files from a first plurality of graphical digital image files. Each graphical digital image file defines an array of pixels for representing the graphical image. Each block is extracted from the first plurality of graphical digital image files. Each block can be a contiguous group of pixels, such as a rectangular group of pixels. The image manager analyzes each block from the plurality of blocks to produce a corresponding variation value for each of the blocks. Each corresponding variation value indicates a level of variation of pixel data within a respective block. The image manager sorts the plurality of blocks according to the variation values produced for the blocks.

The image manager can then organize the plurality of blocks into a second plurality of graphical digital image files. Each respective graphical digital image file, from the second plurality of graphical digital image files, is created from blocks having similar variation values. Optionally, the image manager can organize the plurality of blocks into a second plurality of graphical digital image files based on average color values in addition to the variation values. In other words, each image within a collection of images is divided into blocks and then the image manager extracts, sorts, and reorganizes these blocks into new images to create a second collection of images using the extracted blocks.

The image manager compresses each respective graphical digital image file, from the second plurality of graphical digital image files, using a predetermined image compression algorithm. For example, after creating the collection of new images, image manager can use a JPEG algorithm or a TIFF algorithm to compress each of the new images. With each new image composed of blocks having similar variation values, the predetermined image compression algorithm can compress pixel data more efficiently.

The image manager maintains a map of each block that identifies a location of each respective block with the first plurality of graphical digital image files and within the second plurality of graphical digital image files, so that after decompressing each respective graphical digital image file from the second plurality of graphical digital image files, the image manager can then reorganize the decompressed blocks into the graphical digital image files from the first plurality of graphical digital image files.

Yet other embodiments herein include software programs to perform the steps and operations summarized above and disclosed in detail below. One such embodiment comprises a computer program product that has a computer-storage medium (e.g., a tangible computer readable storage media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: extracting a plurality of blocks from a graphical digital image file, the graphical digital image file defining an array of pixels for representing a graphical image, each block from the graphical digital image file being a group of pixels; analyzing each block from the plurality of blocks to produce a corresponding variation value for each of the blocks, each corresponding variation value indicating a level of variation of pixel data within a respective block; sorting the plurality of blocks according to the variation values produced for the blocks; identifying a level of image compression to apply to each respective block based on the variation value of each respective block, the level of image compression affecting image quality; and compressing each respective block using the level of image compression identified to apply to each respective block. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting electronic image management, storage, and compression. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one example embodiment, an image manager provides for image compression by rearranging an order of blocks from one or more images and then sorting and writing those blocks into one or more different images. This technique enables using a high level of image compression to reduce a relatively large amount of pixels to a common subset of values than would ordinarily be possible with the original image(s).

More specifically, the image manager can subdivide individual images, or each image of a collection of images, into a series of blocks or tiles of predetermined dimensions. The image manager can convert each block from Red Green Blue (RGB) color values to Y'CbCr (luma+chroma components), such as using a specific International Color Consortium (ICC) profile. The image manager can reduce a resolution of chrominance components (Cb and Cr) by factor of two or four to match a JPEG/Exif algorithm to produce similar ranges of values. JPEG compression uses quantization, which is a lossy compression that consists of replacing a range of values by a single average value. Since JPEG uses quantization, the image manager can promote or optimize such quantization compression by rearranging an order of blocks, sorting and writing the blocks into a storage image so that the quantization compression, even set at the highest level of quality (least degradation), can reduce a larger amount of pixels to a common subset of values than otherwise possible.

The image manager applies a discrete cosine transform (DCT), or other predetermined mathematical data transform, to each block to produce a frequency (variation value). The result of the transform is a matrix of a same size as a matrix input size. For example, if a given block were an 8×8 matrix, then applying a DCT will produce an 8×8 matrix with low frequency on [0,0] to higher frequency on [7,7]. Typically, for complex blocks an output matrix tends to be filled with higher values. An output matrix with only [0,0] different than zero means that the blocks have no variation, that is, they are a unified color.

The image manager sorts the blocks on the produced frequency. Blocks with lower frequency values can be stored first. The image manager can use this technique with different JPEG standards such as, for instance, with JPEG 2000 using a discrete wavelet transform (DWT) instead of a DCT. Alternatively, image manager can use a fast cosine transform (FCT) to determine the frequency of each block. Storage files containing the blocks from the collection of images are then saved as a new collection of JPEG images. The image manager can then select any level of compression to apply to the storage files in the new collection of images. A selection of a low level of compression results in higher image quality, while selecting a high level of compression can dramatically reduce file size.

The image manager can use a database to store a location of each block belonging to a given image. This database can also be contained in a metadata field that the JPEG format supports, to avoid transportation of an additional file.

One advantage of using techniques disclosed herein is providing image compression yielding file size or quality results that are about two to four times better than conventional methods. In other words, for a given set of images, techniques disclosed herein can yield an image archive having a file size that is about two to four times smaller than conventional archiving techniques applied to the same given set of images. Alternatively, for the same given set of images, techniques disclosed herein can yield an image archive of a same given file size having about two to four times better image quality than with using conventional methods that storing at the same given file size.

By first sorting blocks based on variation values, the image manager can use quantization compression—even at the highest level of quality—to dramatically reduce stored pixel data. The image manager thus provides a better compression ratio with equivalent image quality than with using conventional compression methods. This saves computer storage space and reduces the amount of data to send by applying the efficiency of JPEG compression on a collection of images. The result is a much better compression ratio (observed 0.8 to 0.4:1) with a quality equivalent to using standard per-image compression that gives a 0.95:1 to 0.7:1 compression ratio.

Figure 1:
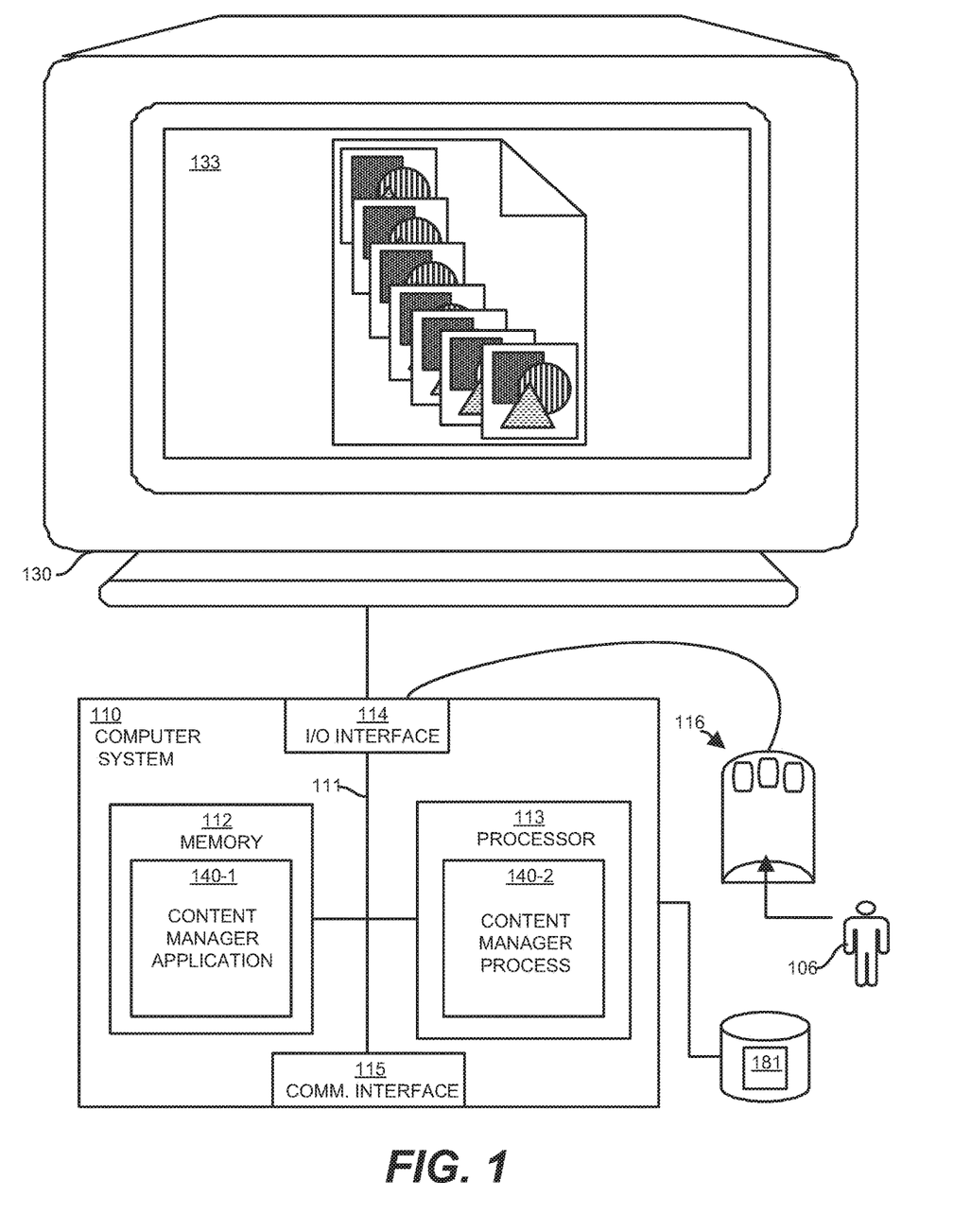
FIG. 1 is an example block diagram of an image manager operating in a computer/network environment according to embodiments herein.

Now more particularly, FIG. 1 shows a general overview of the image manager and how it can be tied to an example physical apparatus, such as a computer and related components. After this description of FIG. 1 appears a more detailed description of processes and methods executed by the image manager itself. This subsequent description will explain the flow charts and reference illustrations in the figures to describe example embodiments.

In FIG. 1, computer system 110 is shown connected to display monitor 130 for displaying a graphical user interface 133 for a user 106 to use a image manager 140 for archiving or compressing images, using input devices 116, including storing a collection of images. Repository 181 can optionally be used for storing image data and blocks both before and after processing. Input devices 116 can include one or more devices such as a keyboard, computer mouse, etc.

Note that the following discussion provides a basic embodiment indicating how to carry out functionality associated with the image manager 140 as discussed above and below. It should be noted, however, that the actual configuration for carrying out the image manager 140 can vary depending on a respective application. For example, as previously discussed, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the image manager 140 of computer system 110 to communicate over a network and, if necessary, retrieve any data required to create views, process content, communicate with a user, etc. according to embodiments herein.

As shown, memory system 112 is encoded with image manager 140-1 that supports functionality as discussed above and as discussed further below. Image manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the image manager 140-1. Execution of the image manager 140-1 produces processing functionality in image manager process 140-2. In other words, the image manager process 140-2 represents one or more portions of the image manager 140 performing within or upon the processor 113 in the computer system 110.

It should be noted that, in addition to the image manager process 140-2 that carries out method operations as discussed herein, other embodiments herein include the image manager 140-1 itself (i.e., the un-executed or non-performing logic instructions and/or data). The image manager 140-1 may be stored on a tangible computer readable storage medium including computer readable storage media such as floppy disk, hard disk, optical medium, etc. According to other embodiments, the image manager 140-1 can also be stored in a memory type system such as in firmware, read only memory (ROM), or, as in this example, as executable code within the memory system 1012.

In addition to these embodiments, it should also be noted that other embodiments herein include the execution of the image manager 140-1 in processor 113 as the image manager process 140-2. Thus, those skilled in the art will understand that the computer system 110 can include other processes and/or software and hardware components, such as an operating system that controls allocation and use of hardware resources, or multiple processors.

Functionality supported by computer system 110 and, more particularly, functionality associated with image manager 140 will now be discussed via flowcharts and illustrations in FIG. 2 through FIG. 7. For purposes of the following discussion, the image manager 140 or other appropriate entity performs steps in the flowcharts.

Figure 2:
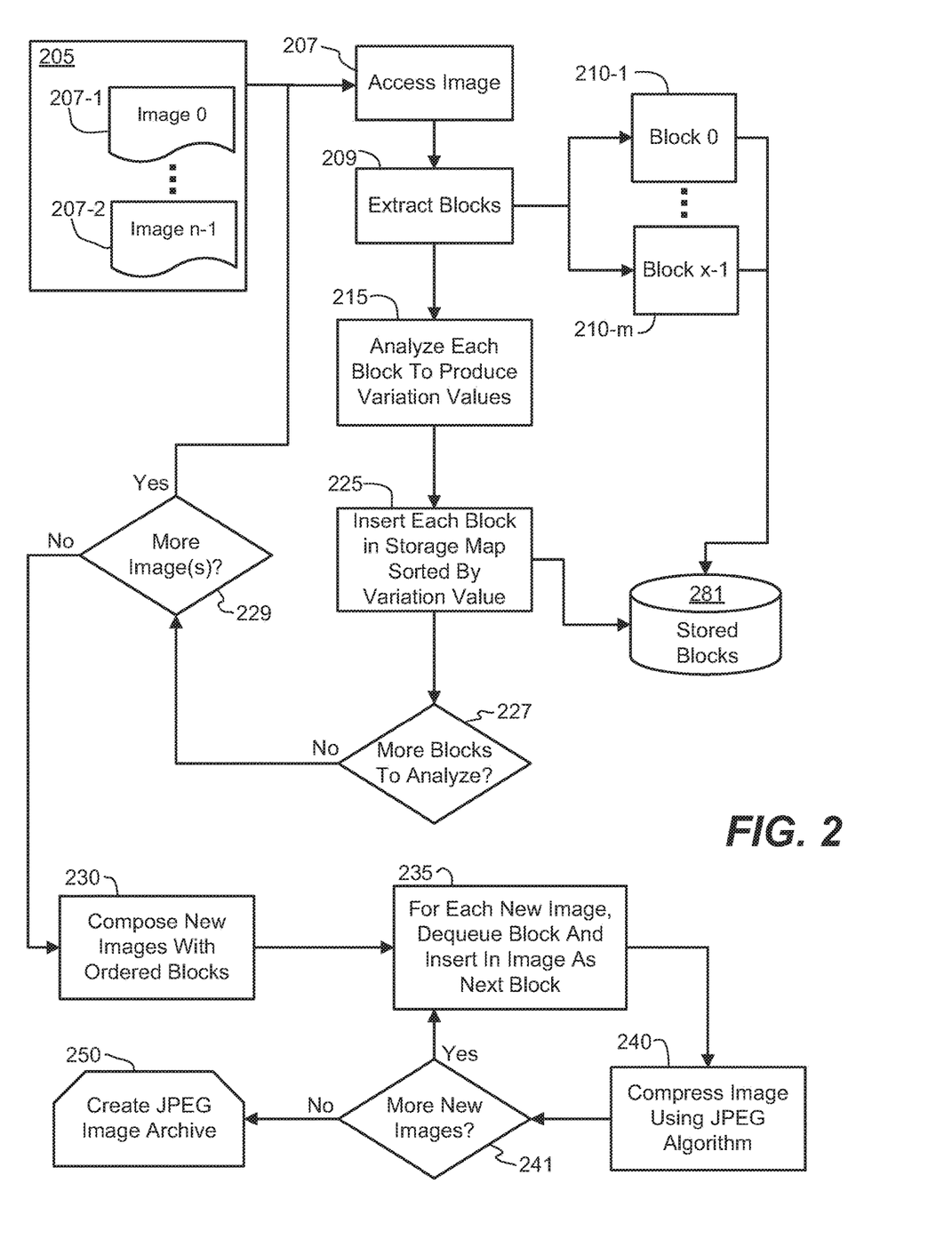
FIG. 2 is a flowchart illustrating an example of a process supporting an image manager according to embodiments herein.

Now describing embodiments more specifically, FIG. 2 is a flow chart illustrating embodiments disclosed herein.

In FIG. 2, collection of images 205 includes images 207-1 and 207-n. For example, collection of images 205 can include multiple images stored on a digital camera, or stored on another digital device or media. In step 207, image manager 140 accesses one or more images. For example, image manager 140 selects a collection of images from a given digital camera, or selects a collection of images from a given file directory, or selects an individual image. In step 209, for each accessed image, image manager 140 extracts blocks 210-1 to 210-m. A block as described herein can also be referred to as a tile.

Each block is a collection, array, or group of pixels. Any designated dimensions can define a given block. For example, blocks could be 8×8 pixels, or 16×8 pixels, or 32×32 pixels, or 62×62 pixels, and so forth. The dimensions of each block, however, can affect image quality. For example, dividing an image into relatively large blocks (62×62) can improve compression for smaller file sizes, but can also result in a corresponding loss of image quality because tiling (visible checker pattern) would become more perceptible to the human eye. On the other hand, using a relatively small block (8×8) can enable an acceptable or tolerable level of image compression while maintaining image quality. Using a small block can be more tolerable because the human eye cannot distinguish an 8×8 block without magnification. Note that the blocks do not need to be squares but can be rectangles or other shapes. A given block shape can be based on a shape of an original image to help conserve an original shape of that image. Selecting all blocks to be a fixed size and to have contiguous pixels, however, can reduce overhead and problems relating to mapping the blocks. Image manager 140 maintains a map or inventory of stored blocks in database 281.

In step 215, image manager 140 analyzes each block to produce variation values to identify which blocks are the same or similar. For example, in one embodiment, image manager 140 can perform a quantization on the blocks using a discrete cosine transform. The result of the discrete cosine transform is a frequency value of pixel data. For a given block having very similar colors, or one blue color, then a resulting frequency or variation output value, for the given block, might be zero or one or two (based on an example arbitrary scale from zero to 100, with zero being no variation and 100 being a maximum variation). A variation value or frequency of zero would mean that all blocks are identical. For a given block having very different colors and brightness and so forth, then a variation value might be very high such as the value of 93 or 94 (in the same example scale from zero to 100). A block with a variation value of 100 would then represent a block having a maximum amount of variation. Such blocks having many different colors cannot be reduced to one single color without losing a lot of data.

While certain JPEG algorithms use the discrete cosine transform process for compression operations, image manager 140 instead uses the discrete cosine transform, or other mathematical transform, to sort blocks to be able to better predict compression for a given image file. Certain other JPEG algorithms use discrete wavelet transform, while other file formats might use a fast Fourier transform. Image manager 140 can optionally use the discrete wavelet transform or fast Fourier transform, or any other frequency identification method used by a given compression codec selected to compress an image.

In step 225, image manager 140 inserts each block into a storage map sorted by variation value. For example, image manager 140 can sort each block from low-frequency to high-frequency, meaning that blocks having few variations are listed or are grouped together, and blocks having many variations are grouped with other blocks having many variations. Image manager 140 maps or ties each block to the original image from which a given block was extracted, and into which the given block will be inserted. Thus, each extracted block is identified and tracked.

In step 227, image manager 140 identifies whether there are more blocks to analyze. If there are no more blocks to analyze from a given image, then image manager identifies whether there are more images, such as from a collection of images, for extraction and analysis of blocks. If all blocks from all selected images have been analyzed, then image manager 140 proceeds to reorganizing the blocks.

In step 230, image manager 140 creates new images with ordered or sorted blocks, based on the variation values of each block. In step 235, image manager 140, for each new image, dequeues a given block and inserts the given block in the new image as a next block. For example, creating new images can result in multiple new images wherein each new image is composed of blocks that are visibly similar. If image manager 140 can create, for example, a new given image composed of blocks of a given variation value (or variation value range) and/or color. This could result in one image being composed entirely of blocks colored a given shade of blue, and another image being composed entirely of blocks of a given brightness of green, and another image being composed entirely of blocks of multiple different contrasting colors. Thus, each new image might appear visually as a mosaic of similar blocks extracted from the collection of images, if rendered for display. In one sense, the new image could be considered as a fake image in that the new image may not be recognizable as a photograph taken from a camera. At the same time, the new image can be an actual image file to which any number of compression techniques can be applied.

Figure 3:
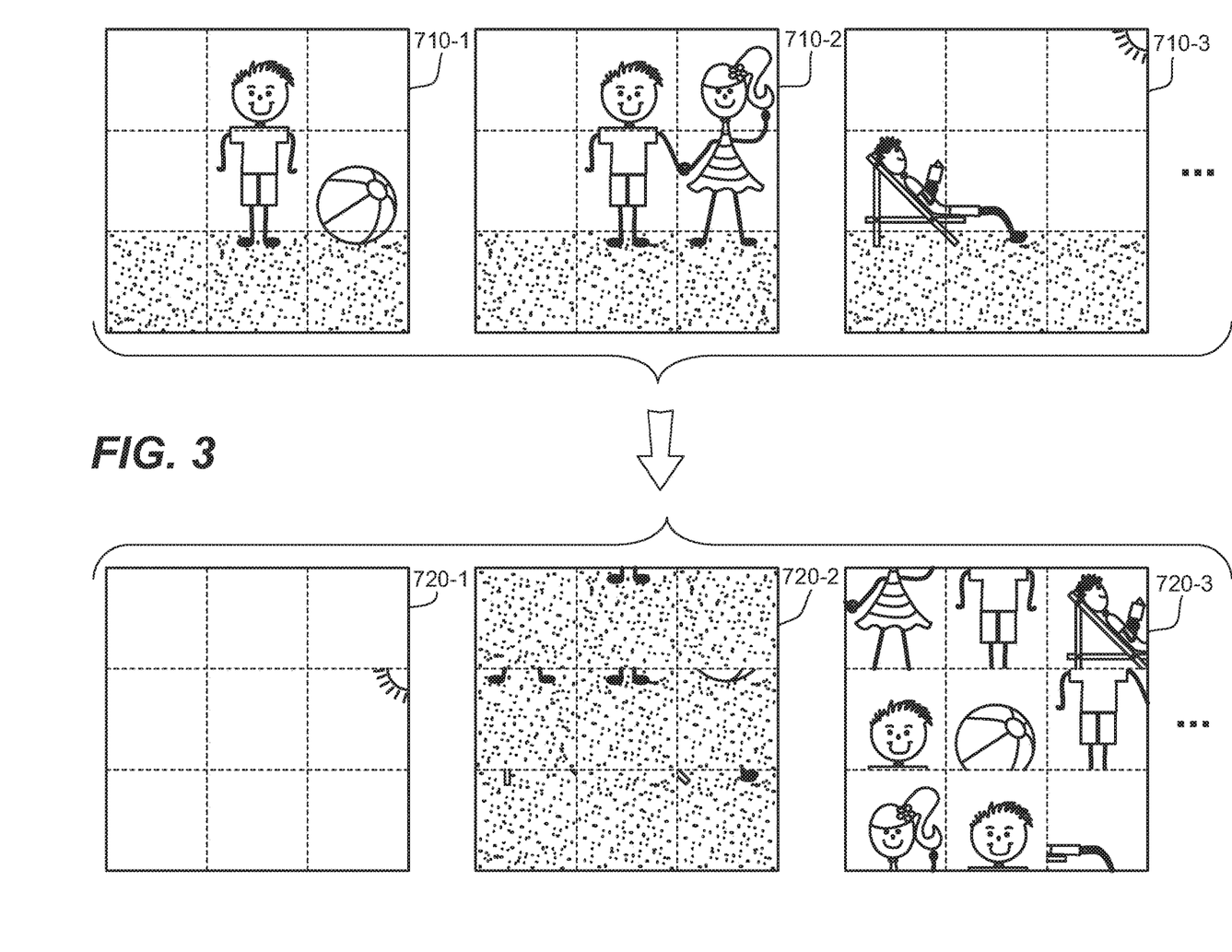
FIG. 3 is an example conceptual illustration of an image reorganization process according to embodiments herein.

FIG. 3 illustrates a conceptualization of this block extraction, sorting, and re-organization process. Images 710-1, 710-2, and 710-3 represent images from collection of images 205, and can be considered a first plurality of graphical digital image files. Each of these images might be snapshots captured by a digital camera of various scenes at a beach. In this example, each image is divided into nine blocks represented by the dotted lines. Note that each image has several blocks that are primarily white or empty. These empty blocks represent a blue, sky background. There are several blocks filled with dots representing sand, and several blocks representing various individuals at the beach.

Upon performing a discrete cosine transform to each of these blocks, image manager 140 can then identify blocks representing the blue sky as having a low variation value, blocks containing sand as having moderate variation values, and blocks containing individuals as having high variation values.

Images 720-1, 720-2, and 720-3 represent new images created with the extracted blocks. Note the block 720-1 is composed primarily of blocks representing sky, which corresponds to low variation values because each block has an array of similar pixel data and variation. Block 720-2 is composed primarily of blocks representing sand. While each block representing sand has more variation within itself than blocks representing sky, each block representing sand has a similar variation value to other blocks representing sand, and thus these blocks containing sand are grouped together into a new image. Image 720-3 is composed primarily of blocks having high variation values depicting individuals that can vary dramatically in shape and color.

The new collection of images, (images 720-1, 720-2, and 720-3) contains the same amount of pixels or blocks as the first collection of images (710-1, 710-2, and 710-3), but if the new collection of images were graphically rendered, as in the conceptualization of FIG. 3, then the new collection of images might appear completely different from the first collection of images. While this simplified, conceptual illustration depicts the new collection of images as having the same quantity and size as the first collection of images, such conformity of size and quantity is not necessary. The new collection of images does not need to have the same number of images as the first collection of images, or even the same size images.

For example, instead of the three images 710-1, 710-2, and 710-3 from the collection of images in FIG. 3, a given image collection might have 100 pictures or 1000 pictures with many of those pictures including blue sky. The new collection of images can include one or more individual images composed of pieces of blue sky. Image manager 140, can create one relatively large image to include all blocks having blue sky, or, in the alternative, image manager 140 can create multiple individual images having pieces of blue sky according to variation values. In a given collection of images there may be blocks of one single color repeated many times. Image manager 140 can create a new image comprised of each of these identical blocks. Such a new image will not require much compression to reduce its file size to a relatively small size. With a low-level of image compression, blocks associated with this image will have very good quality while having a very small size on disk.

Returning to FIG. 3, and the collection of new images, image manager 140 can designate different levels of compression to apply to each of images 720-1, 720-2, and 720-3. For example, image manager 140 might apply a low-level of image compression to image 720-1 (blocks of sky), a moderate level of image compression to image 720-2 (blocks of sand), and a high-level of image compression to image 720-3 (blocks of people). The result of applying variable compression levels, based on variation values of blocks within each new image, is better quality and smaller image file sizes when using a conventional image compression algorithm to complete compression of the new images.

Using variable image compression, based on variation values of blocks, efficiently provides compression with high image quality, in part because of how the human eye functions. The human eye is very sensitive to the tiling effect on areas having low variation. For example, an image of a white wall has relatively low frequency or variation values. Compressing the image of the white wall at a high compression setting results in a perceived low image quality because spots or tiles resulting from image compression are easily noticeable against a uniform white background. This effect is generally undesirable. For example, it is easier for the human eye to perceive a dark speck on a white wall then to perceive a dark speck among grains of sand or blades of grass.

On the other hand, blocks with high variation values can be compressed at a higher level of compression (meaning more data loss) without a perceived loss of image quality. For example, blocks from an area of the image displaying sand typically have multiple different colors of sand grains such as tan, brown, and black. Thus there may already exist several small black grains of sand among other grains. If applying a high-level of image compression results in some blocks turning black, then a few extra black blocks among mixed colors of grains of sand will be very difficult for the human eye to notice. This degradation can also be described as pixilation. Thus, the human eye can tolerate lots of pixilation in areas of an image with high frequency or high variation values, such as areas with lots of color or motion.

Embodiments herein take advantage of the realization by applying different levels of compression to the groupings of blocks depending on a variation of pixels for the blocks. Less compression or lower-loss compression is applied to blocks where loss of pixel data would be easily detectable by the human eye. More compression or more higher-loss compression settings can be applied to blocks in which degradation of pixel data (due to compression) would be less detectable by the human eye.

In step 240, the image manager 140 compresses each new image individually using a predetermined algorithm, such as a JPEG algorithm. If there are more images (step 241) then image manager 140 repeats the process of constructing new images with the sorted blocks. In step 250, image manager 140 creates an image archive, such as an archive of JPEG images. For example, this archive could be stored within a ZIP file, a PDF file, or other data container.

Conventionally, JPEG algorithms apply one compression setting or level to one image. The JPEG algorithm does not apply or cannot apply different compression ratios to different parts of a single image. Thus, the JPEG algorithm applies one compression ration/compression level to an entire image.

JPEG algorithms typically operate with a three-step method. The first step is a data transform, such as DCT, which defines the frequency of blocks. The second step is quantization, which is the process of merging or registering several pixels into fewer pixels. Quantization loses some pixel data. The third step is Huffman encoding, which is a process to rearrange data so that the data fills less space in a file. The Huffman encoding is a binary tree that puts very common items together to be able to indicate a number of instances of a certain type of block, which allows compression to be high because the Huffman encoding only needs to store one copy of several identical blocks. The JPEG algorithm names and identifies these blocks within an image so that during decompression these identical blocks can be copied to corresponding locations or positions within the JPEG image. Huffman encoding is a lossless compression. The Quantization process of JPEG compression is, by definition, lossy. JPEG technology can use variations on the discrete cosine transform including fast cosine transform FCT. Image manager 140 can operate with DCT, DWT, SWT, FWT, or any other mathematical transform to produce variations values.

Thus, image manager 140 performs preprocessing on an image or collection of images prior to application of a JPEG algorithm or other image compression algorithm. This preprocessing enables better image compression by optimizing images for compression.

Image manager 140 can operate on a single image, or on a collection of images. Applying the process to a single image can result in 10-20% better compression. Applying the process to a collection of images can produce an overall file size that is about two to four times smaller. For example, a collection of images that has a total disk size of 1 GB can be reduced to less than 300 MB while maintaining a same image quality of the 1 GB image collection. This significant size reduction is in part due to the economies of scale. With a relatively large collection of images having billions of pixels, there is typically a wide range of variation values and many blocks that are identical or nearly identical. With so many identical or nearly identical blocks, newly created images can be very close to being a single color. With many single color images, image compression is inherently more efficient because the Huffman encoding will be more optimized.

Figure 4:
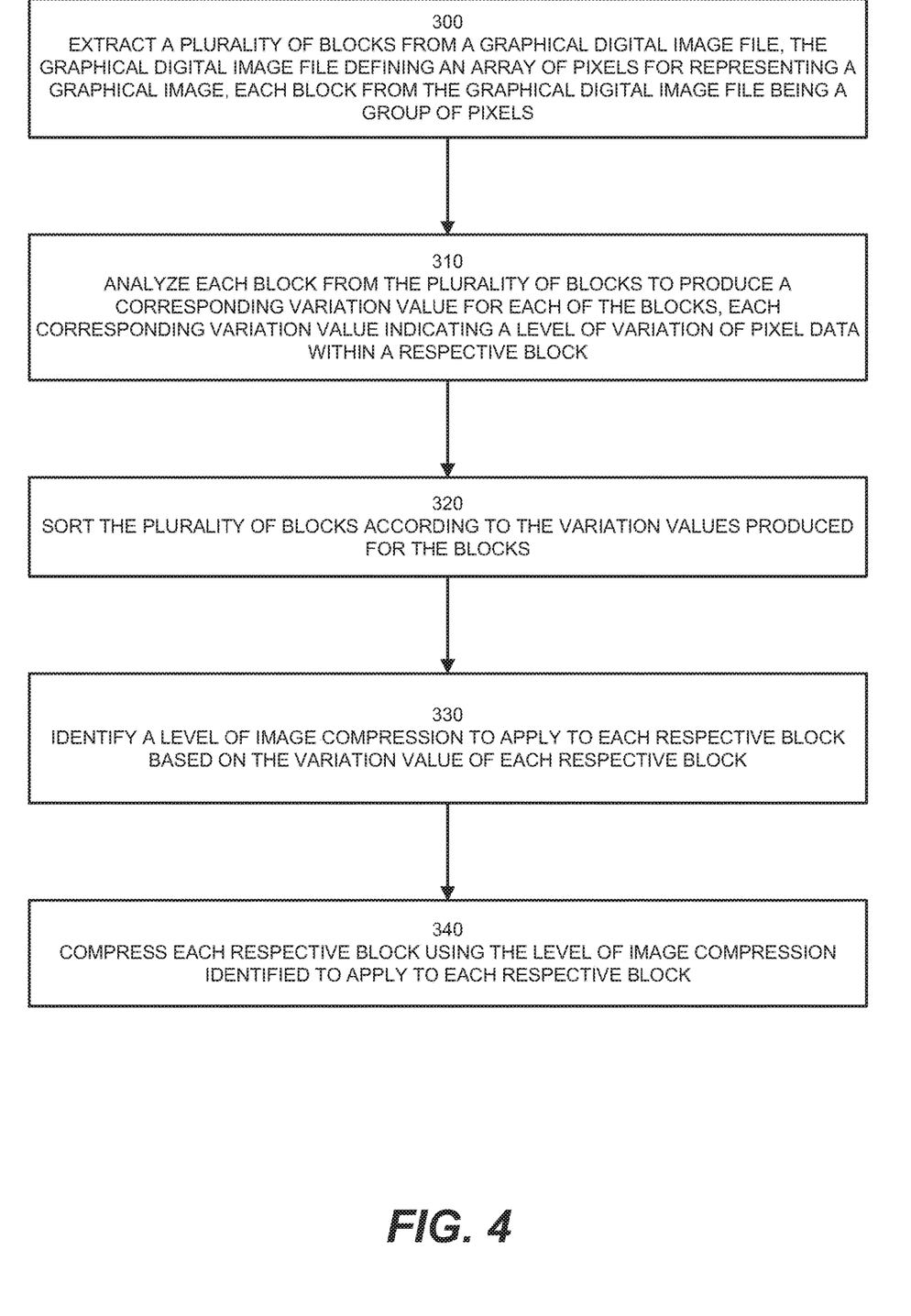
FIG. 4 is a flowchart illustrating an example of a process supporting an image manager according to embodiments herein.

Another embodiment of the image management process appears in the flow chart of FIG. 4.

In step 300, image manager 140 extracts a plurality of blocks from a graphical digital image file. The graphical digital image file defines an array of pixels for representing a graphical image, such as in a bitmap or raster image. Each block from the graphical digital image file is a group of pixels. Thus, the array of pixels is segmented into groups of pixels.

In step 310, image manager 140 analyzes each block from the plurality of blocks to produce a corresponding variation value for each of the blocks. Each corresponding variation value indicates a level of variation of pixel data within a respective block. For example, image manager 140 can execute a discrete cosine transform or discrete wavelet transform or other transform to identify a frequency of variation among pixel data within each respective block.

In step 320, image manager 140 sorts the plurality of blocks according to the variation values produced for the blocks. For example, image manager 140 can sort the blocks from low variation values to high variation values.

In step 330, image manager 140 identifies a level of image compression to apply to each respective block based on the variation value of each respective block. The level of image compression affects image quality and/or defines a compression ratio. Thus, high compression results in high degradation meaning that pixel data can be discarded and a rendering of the image can be perceived as lower quality by observation of the human eye.

In step 340, image manager 140 compresses each respective block using the level of image compression identified to apply to each respective block. In other words some blocks may have been tagged for low image compression, while other blocks have been tagged for moderate image compression, while yet other blocks have been tagged for high image compression. Each block can be compressed using a different compression level than applied to other blocks depending on variation values. That is, blocks with higher variation are compressed using a lossier compression algorithm, while blocks with lower variation are compressed using a less lossy compression algorithm or algorithm setting.

Figure 5:
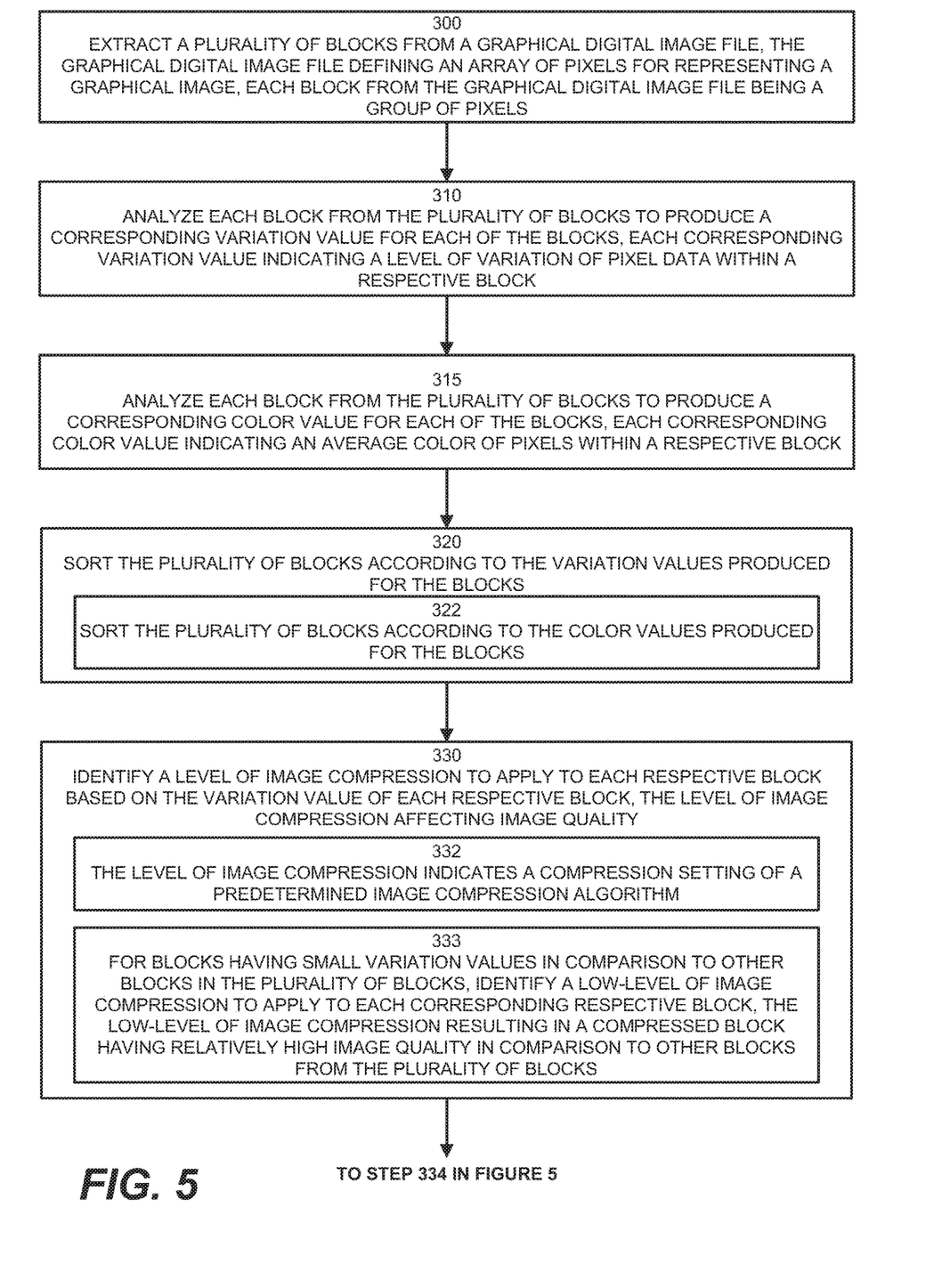
FIG. 5-6 is a flowchart illustrating an example of a process supporting a image manager according to embodiments herein.
Figure 6:
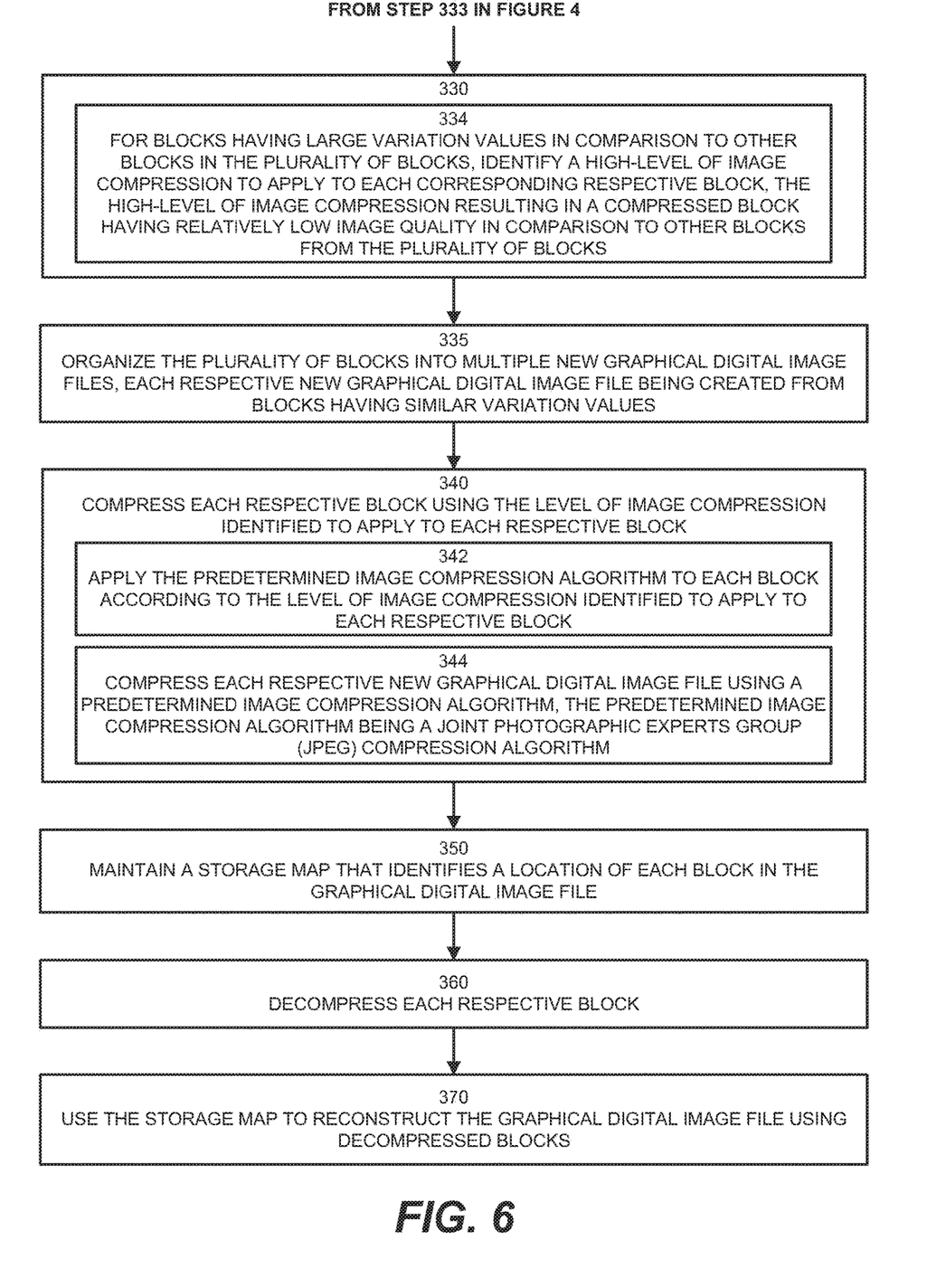

Another embodiment of the image management process appears in the flow chart of FIGS. 5-6. This embodiment expands on embodiments in FIG. 4 with additional alternative features.

In step 300, image manager 140 extracts a plurality of blocks from a graphical digital image file. The graphical digital image file defines an array of pixels for representing a graphical image. Each block from the graphical digital image file is a group of pixels.

In step 310, image manager 140 analyzes each block from the plurality of blocks to produce a corresponding variation value for each of the blocks. Each corresponding variation value indicates a level of variation of pixel data within a respective block.

In step 315, image manager 140 analyzes each block from the plurality of blocks to produce a corresponding color value for each of the blocks, each corresponding color value indicating an average color of pixels within a respective block. In the previous step, identifying variation values typically produces a number representing a frequency of variation of pixel data. This variation value may not always designate a color. Image manager 140, however, can also identify or produce one or more colors to identify each respective block. For example, image manager 140 can calculate an average color of pixels within a given block and store or associate this average color indication with the variation value.

In step 320, image manager 140 sorts the plurality of blocks according to the variation values produced for the blocks.

In step 322, image manager 140 sorts the plurality of blocks according to the color values produced for the blocks. Thus, image manager 140 can sort blocks by both variation values and by color. Sorting blocks into different images based on color enables the Huffman encoding (as part of JPEG image compression) to be more optimized.

Sorting both on frequency and color improves image compression. For example, there may be two blocks having a same frequency or variation value, but one block is predominantly blue while the other block is predominately red. If image manager 140 creates a new image for compression with both blue and red blocks, then, depending on the level of compression and data loss as applied to an entire image (especially a strong level of quantization), some of the blue blocks can become reddish while some of the red blocks can become bluish. When these color-modified blocks are reorganized into the original image, then such color modification can be noticeable and undesirable. For example, a block belonging to a blue sky region of an original image may have become reddish during compression and thus placing the now reddish block within a blue region of a reconstructed image might be noticeable. Sorting by variation and color prevents the JPEG algorithm from creating artifacts that the human eye can perceive. Sorting by color does not substantially affect a compression ratio, but can affect a quality of the image.

Image manager 140 can execute the dual sorting in various ways. For example, image manager 140 can first sort and group blocks within a particular range of variation values, and then within that range execute a secondary sorting based on color or average color of each respective block. The range of variation values can be based on percentages or equal division of all blocks. For percentage sorting, one group of blocks might contain all blocks having a variation of 0-2%. Within this percentage range, image manager 140 can then sort blocks based on any number of predetermined colors or color ranges. Both the variation sorting and color sorting can be organized and maintained in a hash table.

In step 330, image manager 140 identifies a level of image compression to apply to each respective block based on the variation value of each respective block. The level of image compression affects image quality or the level of image compression indicates a compression ratio.

In step 332, the level of image compression indicates a compression setting of a predetermined image compression algorithm. This compression setting can correspond to a specific compression ratio. For example, there are several conventionally available image compression algorithms such as TIFF, PNG, and JPEG. Some image compression algorithms enable selectable levels of image compression, which can correspond to an amount of file size reduction and/or image degradation.

In step 333, for blocks having small variation values in comparison to other blocks in the plurality of blocks, image manager 140 identifies a low level of image compression to apply to each corresponding respective block. The low level of image compression results in a compressed block having relatively high image quality in comparison to other blocks from the plurality of blocks. As previously explained, degrading blocks having low variation values is more likely to result in artifacts, tiling, or other easily observed defects in a reconstructed or decompressed image rendered for a human eye. Applying a low level of image compression to such low frequency areas thus preserves image quality.

In step 334, for blocks having large variation values in comparison to other blocks in the plurality of blocks, image manager 140 identifies a high level of image compression to apply to each corresponding respective block. The high level of image compression results in a compressed block having relatively low image quality in comparison to other blocks from the plurality of blocks. Also, as previously explained, the human eye can tolerate more image degradation in areas of high frequency/high variation because the human eye cannot easily detect modifications or changes to such areas of a rendered image.

In step 335, image manager 140 organizes the plurality of blocks into multiple new graphical digital image files, each respective new graphical digital image file being created from blocks having similar variation values. Thus, image manager 140 can either apply compression to individual blocks from the image, or can first create a new set or collection of images using the extracted blocks from the original image. Thus, image manager 140 might extract blocks from an original image, analyze and sort the blocks, then create 4, 10, 20, or more new images using the extracted blocks. Since each block is used once in the new images, then the new images will have smaller dimensions then the original image.

In step 340, image manager 140 compresses each respective block using the level of image compression identified to apply to each respective block.

In step 342, image manager 140 applies the predetermined image compression algorithm to each block according to the level of image compression identified to apply to each respective block. For blocks identified to apply a high compression ratio, then image manager 140 applies high compression. The level of image compression identified depends on pixel data of each block and image. For example, for an image of people at the beach depicting sand and sky, image manager 140 might apply a wide range of compression levels. If a given image, instead, depicts a scene filled entirely with foliage, then most blocks from that image will probably receive a higher level of image compression.

In step 344, image manager 140 compresses each respective new graphical digital image file using a predetermined image compression algorithm. The predetermined image compression algorithm being a joint photographic experts group (JPEG) compression algorithm. Image manager 140 can select from any of several standards such as JPEG or JPEG 2000.

In step 350, image manager 140 maintains a storage map that identifies a location of each block in the graphical digital image file. Blocks are extracted from a first image and reorganized for compression, but these blocks will need to be subsequently accessed individually. Maintaining a storage map then assists with block identification and management.

In step 360, image manager 140 decompresses each respective block. Blocks typically need to be decompressed to be able to be graphically rendered on a display.

In step 370, image manager 140 uses the storage map to reconstruct the graphical digital image file using decompressed blocks. Ultimately, original images need to be reconstructed or reassembled for viewing. Using the storage map assists with the reassembly process.

Figure 7:
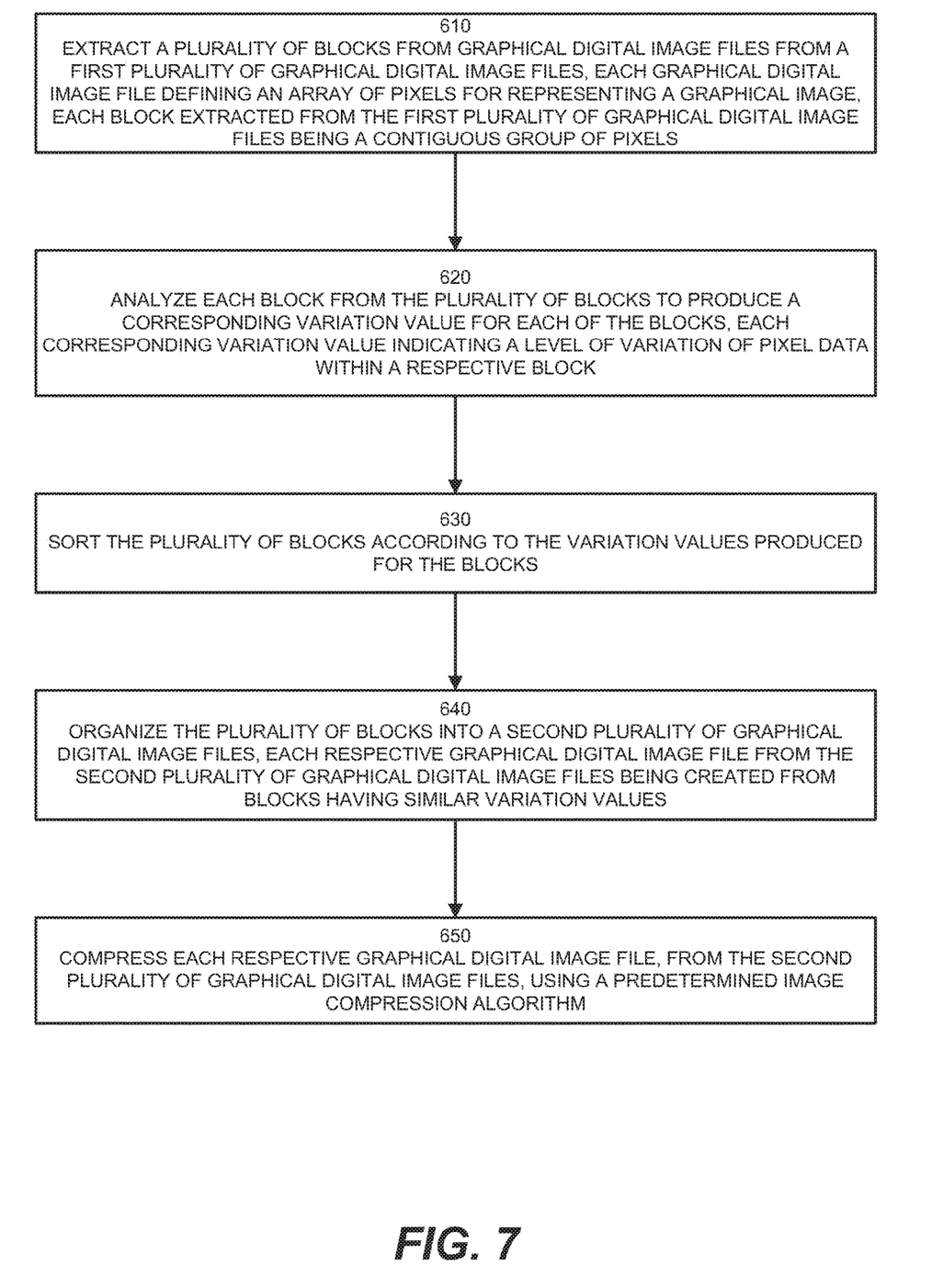
FIG. 7 is a flowchart illustrating an example of a process supporting an image manager according to embodiments herein.

Another embodiment of the image management process appears in the flow chart of FIG. 7.

In step 610, image manager 140 extracts a plurality of blocks from graphical digital image files from a first plurality of graphical digital image files. Each graphical digital image file defines an array of pixels for representing a graphical image. Each block extracted from the first plurality of graphical digital image files is a contiguous group of pixels. For the first plurality of graphical digital image files, image manager 140 can access a collection of images from a file directory, from a digital camera, from another electronic device, etc. The number of images in the collection can be any number. There could be tens, hundreds, thousands, or more images included in the first plurality of graphical digital images. Whatever the number of images selected for inclusion in the first plurality, image manager 140 can extract blocks across all of these images. Each image can be divided into fixed or variable size blocks, and then image manager 140 extracts all of these blocks. Depending on the collection of images and designated block size, such extraction can produce thousands, millions, billions, or more, of blocks aggregated from the images.

In step 620, image manager 140 analyzes each block from the plurality of blocks to produce a corresponding variation value for each of the blocks. Each corresponding variation value indicates a level of variation of pixel data within a respective block. In other words, each individual block is separately analyzed to produce a variation value of pixel data within that block. For example, if the block were 8×8 pixels, then there would be 64 pixels within a given block. Some blocks might have pixels of predominantly one color, while other blocks have pixels with many different colors. Each pixel can also include other graphical data such as luminance, chrominance, hue, etc. If each pixel within a given block has data that varies substantially from other pixel data within the block, then image manager 140 will produce a relatively high or large variation value. If pixel data within a given block is all very similar, then this will produce a relatively low or small variation value.

Image manager 140 can further analyze each block from the plurality of blocks to produce a corresponding color value for each of the blocks. Each corresponding color value indicates an average color of pixels within a respective block.

In step 630, image manager 140 sorts the plurality of blocks according to the variation values produced for the blocks. Image manager 140 can further, optionally, sort the plurality of blocks according to the color values produced or identified for the blocks.

In step 640, image manager 140 organizes the plurality of blocks into a second plurality of graphical digital image files, each respective graphical digital image file from the second plurality of graphical digital image files is created from blocks having similar variation values. For example, a given collection of images is comprised of 1000 images with each image have dimensions of 1280×1024 pixels. If image manager 140 divides each image into blocks of 8×8 pixels, then each image would have 20,480 blocks. Summing blocks from the entire image collection, image manager 140 would then extract 20,480,000 blocks. Image manager 140 would then use these 20,480,000 blocks to create a second plurality of images. The second plurality of images would have a sum total of 20,480,000 blocks, but not necessarily the same number of images (1000) or same size images. Image manager 140 might group all blocks of a particular blue color and variation into an image with dimensions of 5000×5000 pixels (larger than images from the first plurality of images). Image manager 140 might create another image comprised of blocks having high variation values with a created image having dimensions of, for example, 400×600 pixels. A total number of created images in the second plurality might be 1000 images, 222 images, 4040 images, and so forth. Thus, the second plurality of graphical digital image files can have a quantity of graphical digital image files different than a quantity of graphical digital image files from the first plurality of graphical digital image files.

Image manager 140 can also create each respective graphical digital image file from the second plurality of graphical digital image files using blocks having similar color values. In some cases, a block with various shades of green can have a similar or identical variation value as another block having various shades of yellow. To avoid creating blocks with mixed colors, image manager 140 can further create new images based on color in addition to variation values.

Image manager 140 can optionally identify a level of image compression to apply to each respective graphical digital image file, from the second plurality of graphical digital image files, based on variation values produced for blocks from each respective graphical digital image file. The level of image compression affects image quality, meaning that the compression can visually degrade an image. The level of image compression indicates a compression setting of a predetermined image compression algorithm. This compression setting corresponds to a specific compression ratio. For example, a predetermined image compression algorithm might provide ten different compression levels ranging from no image degradation to severe image degradation (but with a small file size).

For graphical digital image files comprised of blocks having small variation values in comparison to other blocks in the plurality of blocks, image manager 140 can identify a low compression setting to apply to each corresponding respective graphical digital image file to result in a compressed image file having relatively high image quality in comparison to other graphical digital image files from the second plurality of graphical digital image files.

For graphical digital image files comprised of blocks having large variation values in comparison to other blocks in the plurality of blocks, image manager 140 can identify a high compression setting to apply to each corresponding respective graphical digital image file to result in a compressed image file having relatively low image quality in comparison to other graphical digital image files from the second plurality of graphical digital image files.

In step 650, image manager 140 compresses each respective graphical digital image file, from the second plurality of graphical digital image files, using a predetermined image compression algorithm. After blocks are extracted, analyzed and reorganized into a collection of new images, image manager 140 then applies an image compression algorithm to each individual newly created image. Each respective new image has blocks with similar values, thus image compression will be inherently more efficient.

Image manager 140 can then apply the predetermined image compression algorithm to each respective graphical digital image file from the second plurality of graphical digital image files using the level of image compression identified to apply to each respective graphical digital image file.

Image manager 140 can also execute several additional steps. Image manager 140 can maintain a storage map that identifies a location of each block in the first plurality of graphical digital image files and that identifies a location of each block in the second plurality of graphical digital image files. The storage map assists with reconstructing images. Image manager 140 decompresses each respective graphical digital image file, from the second plurality of graphical digital image files, using the predetermined image compression algorithm. Subsequently, image manager 140 extracts the plurality of blocks from decompressed graphical digital image files from the second plurality of graphical digital image files, and uses the storage map to reconstruct graphical digital image files from the first plurality of graphical digital image files using decompressed blocks.

With reorganization of blocks into a collection of new images, image manager 140 can produce an optimized set of images for the JPEG format. The JPEG algorithm does not apply a different compression setting to different blocks within a single image. Thus image manager 140 provides the benefit of using different compression settings for different areas of a given image because the collection of images is reorganized into a new plurality of images enabling the JPEG specification to provide varied compression on an image-by-image basis or based on groupings of images.

In other embodiments, the compression setting can be dynamic. For example a user can decide that portions of images depicting an ocean are not important and can receive more image degradation, while other areas of that image, such as human faces, should maintain high image quality. Image manager 140 can then identify and track such areas for corresponding compression. For example, even though a facial region might have relatively higher variation values, a particular user may not want any degradation on these regions. Image manager 140 can then create an image(s) comprised of blocks within a facial region to apply a lower level of image compression. Image manager 140 enables a user to dynamically select areas of the image to apply specified levels of compression.

In one embodiment, image manager 140 can be used for creating a PDF portfolio. A PDF portfolio is a file that embeds attachments within which a user can navigate. Thus the PDF portfolio is a PDF file containing a navigator and embedded files and can function as a type of file archive.

In another embodiment, image manager 140 can compress a collection of images to yield a predetermined file size. For example, a user desires to share the entire contents of a digital camera, which could be several hundred megabytes. The user, however, desires to limit the total size of the collection of images to be able to fit on a CD or DVD. Image manager 140 can then compress images from the digital camera to all fit on a given CD or DVD media. The result is storing the collection of images on the media, but with an image quality about two to four times greater than without using image manager 140.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method to perform preprocessing, compression, and archiving of a collection of digital image files comprising pixels, the method comprising:
   with a processor, extracting blocks from each of a plurality of digital image files from a collection of digital image files, wherein each block comprises a subset of the pixels of a respective digital image file;
   analyzing, with the processor, each of the blocks to determine a corresponding variation value for each of the blocks, wherein the variation value indicates a frequency result of a transform of each of the blocks;
   creating, with the processor, a plurality of new digital image files each comprising a plurality of the blocks extracted from at least two of the plurality of digital image files, wherein the blocks selected for each particular new digital image file are those of the blocks of a given range of variation values;
   identifying, with the processor, a level of image compression to apply to each particular new digital image file such that the level of image compression is optimized for the variation values of the blocks in the particular new digital image file; and
   compressing, with the processor, each particular new digital image file using the level of image compression identified to apply to the particular new digital image file.

2. The computer-implemented method of claim 1, further comprising:
   creating an image archive including the plurality of compressed new digital image files and storing the image archive to a memory.

3. The computer-implemented method of claim 1, further comprising:
   analyzing, with the processor, each of the blocks to produce a corresponding color value for each of the blocks, each corresponding color value indicating an average color of pixels within a respective block, wherein the blocks selected for each particular new digital image file are those of the blocks of a predetermined color range.

4. The computer-implemented method of claim 1, wherein the identified level of image compression to apply to each particular new digital image file indicates a compression setting of a predetermined image compression algorithm; and
   wherein compressing each particular new digital image file includes applying the predetermined image compression algorithm to the particular new digital image file according to the identified level of image compression.

5. The computer-implemented method of claim 1, wherein the transform is one of: a discrete cosine transform, a discrete wavelet transform, a fast Fourier transform, or a fast cosine transform.

6. The computer-implemented method of claim 1, wherein identifying the level of image compression to apply to each particular new image file includes:
   for each particular new digital image file having small pixel data variation values in comparison to others of the new digital image files, identifying, with the processor, a low level of image compression to apply to the particular new digital image file, the low level of image compression resulting in a compressed new digital image file having relatively high image quality in comparison to others of the new digital image files; and
   for each particular new digital image file having large pixel data variation values in comparison to others of the new digital image files, identifying, with the processor, a high level of image compression to apply to the particular new digital image file, the high level of image compression resulting in a compressed new digital image file having relatively low image quality in comparison to others of the new digital image files.

7. The computer-implemented method of claim 1, further comprising:
   with the processor, creating a storage map indicating a location of each block in the plurality of digital image files and an additional location of each block in the plurality of new digital image files, wherein the storage map is sorted based on the variation value of each of the blocks, and storing the storage map in a memory;
   decompressing, with the processor, each of the new digital image files; and with the processor, accessing the storage map from the memory and using the storage map to reconstruct the plurality of digital image files from the blocks of the decompressed new digital image files.

8. The computer-implemented method of claim 1, further comprising:
compressing each particular new digital image file using a Joint Photographic Experts Group (JPEG) compression algorithm.

9. A computer program product including a non-transitory computer-storage medium having instructions stored thereon for preprocessing, compression, and archiving of a collection of digital image files comprising pixels, such that the instructions, when carried out by a processing device, cause the processing device to perform operations of:
extracting blocks from each of a plurality of digital image files from a collection of digital image files, wherein each block comprises a subset of the pixels of a respective digital image file;
analyzing each of the blocks to determine a corresponding variation value for each of the blocks, wherein the variation value indicates a frequency result of a transform of each of the blocks;
creating a plurality of new digital image files each comprising a plurality of the blocks extracted from at least two of the plurality of digital image files, wherein the blocks selected for each particular new digital image file are those of the blocks of a given range of variation values;
identifying a level of image compression to apply to each particular new digital image file such that the level of image compression is optimized for the variation values of the blocks in the particular new digital image file; and
compressing each particular new digital image file using the level of image compression identified to apply to the particular new digital image file.

10. The computer program product of claim 9, further comprising instructions for causing the processing device to perform the operations of:
creating an image archive including the plurality of compressed new digital image files and storing the image archive to a memory.

11. The computer program product of claim 9, further comprising instructions for causing the processing device to perform the operations of:
analyzing each of the blocks to produce a corresponding color value for each of the blocks, each corresponding color value indicating an average color of pixels within a respective block, wherein the blocks selected for each particular new digital image file are those of the blocks of a predetermined color range.

12. The computer program product of claim 9, wherein the identified level of image compression to apply to each particular new digital image file indicates a compression setting of a predetermined image compression algorithm; and
wherein compressing each particular new digital image file includes applying the predetermined image compression algorithm to the particular new digital image file according to the identified level of image compression.

13. The computer program product of claim 9, wherein the transform is one of: a discrete cosine transform, a discrete wavelet transform, a fast Fourier transform, or a fast cosine transform.

14. The computer program product of claim 9, wherein identifying the level of image compression to apply to each particular new image file includes:
for each particular new digital image file having small pixel data variation values in comparison to others of the new digital image files, identifying a low level of image compression to apply to the particular new digital image file, the low level of image compression resulting in a compressed new digital image file having relatively high image quality in comparison to others of the new digital image files; and
for each particular new digital image file having large pixel data variation values in comparison to others of the new digital image files, identifying a high level of image compression to apply to the particular new digital image file, the high level of image compression resulting in a compressed new digital image file having relatively low image quality in comparison to others of the new digital image files.

15. The computer program product of claim 9, further comprising instructions for causing the processing device to perform the operations of:
creating a storage map indicating a location of each block in the plurality of digital image files and an additional location of each block in the plurality of new digital image files, wherein the storage map is sorted based on the variation value of each of the blocks, and storing the storage map in a memory;
decompressing, with the processing device, each of the new digital image files; and
with the processing device, accessing the storage map from the memory and using the storage map to reconstruct the plurality of digital image files from the blocks of the decompressed new digital image files.

16. The computer program product of claim 9, further comprising instructions for causing the processing device to perform the operations of: compressing each particular new digital image file using a Joint Photographic Experts Group (JPEG) compression algorithm.

17. A computer program product including a non-transitory computer-storage medium having instructions stored thereon for decompression and reconstruction of original digital image files from an image archive, the original digital image files comprising pixels, such that the instructions, when carried out by a processing device, cause the processing device to perform operations of:
receiving an image archive comprising a plurality of compressed digital image files comprising blocks of pixels, wherein each particular block of pixels has a variation value indicating a frequency result of a transform of the particular block, and wherein each compressed digital image file is comprised of blocks of pixels having a given range of variation values for each of the blocks;
receiving a storage map that identifies a current location of each particular block in one of the compressed digital image files and that identifies an original location of each particular block in one of a plurality of original digital image files;
decompressing each respective digital image file using a level of decompression corresponding to the given range of variation values of its blocks of pixels;
extracting a plurality of decompressed blocks from the decompressed digital image files; and
using the storage map to reconstruct the plurality of original digital image files from the decompressed blocks, wherein each original digital image file comprises at least one decompressed block from more than one of the plurality of compressed digital image files.

18. The computer program product of claim 17, wherein the level of decompression to apply to each respective digital image file indicates a compression setting of a predetermined image decompression algorithm; and wherein decompressing each respective digital image file includes applying the predetermined image decompression algorithm to the respective digital image file according to the level of decompression.

19. The computer program product of claim 17, wherein the transform is one of: a discrete cosine transform, a discrete wavelet transform, a fast Fourier transform, or a fast cosine transform.

20. The computer program product of claim 17, wherein the processing device performs the operations of: compressing each particular new digital image file using a Joint Photographic Experts Group (JPEG) compression algorithm.

* * * * *